(12) United States Patent
Comeaux (10) Patent No.: US 10,800,241 B2
(45) Date of Patent: Oct. 13, 2020

(54) COMPREHENSIVE PROTECTIVE COVER FOR VEHICLE DOOR WITH FRAMELESS WINDOW

(71) Applicant: CARVEST, LLC, Alexandria, VA (US)

(72) Inventor: Noel Comeaux, Alexandria, VA (US)

(73) Assignee: Carvest, LLC

( * ) Notice: Subject to any disclaimer, the term of this patent is extended or adjusted under 35 U.S.C. 154(b) by 0 days.

(21) Appl. No.: 15/852,304

(22) Filed: Dec. 22, 2017

(65) Prior Publication Data

US 2019/0193545 A1    Jun. 27, 2019

(51) Int. Cl.
*B60J 11/06* (2006.01)
*B60J 11/08* (2006.01)

(52) U.S. Cl.
CPC .............. *B60J 11/08* (2013.01); *B60J 11/06* (2013.01)

(58) Field of Classification Search
CPC .............. B60J 11/00; B60J 11/08; B60J 11/06
USPC .............................. 150/166, 168; 160/370.21
See application file for complete search history.

(56) References Cited

U.S. PATENT DOCUMENTS

| | | | |
|---|---|---|---|
| 3,085,621 A * | 4/1963 | Meranto | B60J 1/2011 160/354 |
| 3,749,147 A * | 7/1973 | Hess | B60J 1/2011 160/105 |
| 4,041,999 A | 8/1977 | Miller | |
| 4,531,560 A | 7/1985 | Balanky | |
| 4,810,015 A | 3/1989 | McNeil | |
| 4,896,911 A | 1/1990 | Duke | |
| 5,161,849 A * | 11/1992 | Holland, Jr. | B60J 11/00 116/28 R |
| 5,290,618 A | 3/1994 | Olson et al. | |
| 5,435,362 A | 7/1995 | Chiang | |
| 5,524,694 A * | 6/1996 | Arapis | B60J 1/2011 160/354 |
| 5,845,958 A * | 12/1998 | Rudys | B60J 11/00 296/136.08 |
| 6,254,170 B1 | 7/2001 | Farmer et al. | |
| 6,588,827 B2 | 7/2003 | Heiland | |
| 7,100,965 B1 | 9/2006 | Stover | |
| 7,204,280 B2 | 4/2007 | Allen | |
| 8,584,719 B2 | 11/2013 | Rodriguez | |
| 2009/0047535 A1* | 2/2009 | Crilly | E06B 3/7001 428/542.6 |
| 2011/0056634 A1* | 3/2011 | Crozier | B60J 11/08 160/370.21 |
| 2015/0013862 A1 | 1/2015 | Nomura et al. | |

(Continued)

FOREIGN PATENT DOCUMENTS

| | | | | |
|---|---|---|---|---|
| EP | 0980775 A1 * | 2/2000 | ............ | B60J 1/2011 |
| JP | 2012218685 A * | 11/2012 | ............ | B62D 35/00 |
| WO | WO-9710964 A1 * | 3/1997 | ............ | B60J 1/2011 |

*Primary Examiner* — Sue A Weaver
(74) *Attorney, Agent, or Firm* — H. Jay Spiegel (57) ABSTRACT

A protective cover includes a sleeve which overlies the entirety of the inside and outside of a vehicle window and has a peripheral seal which seals against the frame for the window which is integral with the vehicle body. A sock-like sleeve encloses the vehicle side mirror and a large protective portion overlies the painted door structure below the window. Fore and aft straps have fasteners on their ends which allow fastening to fastener halves mounted inside the front and rear wheel wells of the vehicle.

20 Claims, 8 Drawing Sheets

(56) References Cited

U.S. PATENT DOCUMENTS

2015/0224863 A1* 8/2015 Yang .................. B60J 11/08
              150/168
2016/0207385 A1* 7/2016 Ward .................. B60J 11/04

* cited by examiner

COMPREHENSIVE PROTECTIVE COVER FOR VEHICLE DOOR WITH FRAMELESS WINDOW

BACKGROUND OF THE INVENTION

The present invention relates to a comprehensive protective cover for vehicle door with frameless window. Protective covers for vehicle components are known in the prior art. There are various examples in the prior art of protective covers which cover doors, windows, side panels, hoods, and other components of the exterior surface of a vehicle. Such devices are intended to protect the vehicle components against scratching, vandalism, engagement with components of other vehicles, and for other reasons.

Some vehicles such as the 1997-2003 Chevrolet Corvette have vehicle doors which include windows which are not surrounded by a frame on the door. For example, when the doors of such vehicles are opened, the entire periphery of the window is completely visible when it is raised including its periphery consisting of a front edge, top edge, and rear edge.

Such windows are less well protected than windows in which the door has a frame surrounding the window. As such, it would be advantageous to provide a comprehensive protective cover which not only protects the door structure but also surrounds the window. Such a cover would be advantageous if it also assisted in blocking sunlight from entering the cabin of the vehicle. It is with this aspects in mind that the present invention was developed.

The following prior art is known to Applicant:

| U.S. Patents |
| --- |
| 4,041,999 to Miller |
| 4,531,560 to Balanky |
| 4,810,015 to McNeil |
| 4,896,911 to Duke |
| 5,161,849 to Holland, Jr. |
| 5,290,618 to Olson et al. |
| 5,435,362 to Chiang |
| 6,254,170 to Farmer et al. |
| 6,588,827 to Heiland |
| 7,100,965 to Stover |
| 7,402,280 to Allen |
| 8,584,719 to Rodriguez |

U.S. PUBLISHED PATENT APPLICATION

2015/0013862 A1 to Nomura et al.

The references listed above include the following pertinent features: Miller teaches a vehicle protector that covers a vehicle door. Balanky is similar to Miller. McNeil teaches a door protector including straps attached at the front and rear wheel wells. Duke teaches a side protector with a strap attached at the window.

Holland, Jr. is another example of a protector with straps attached at the wheel wells. Olson et al. teach an automobile fender protector that includes flexible cords and hooks to secure it. Chiang teaches a car cab cover with window and door protector draped downward. Farmer et al. teach a vehicle door protector with securing straps as shown in FIG. 5.

Heiland shows a variety of vehicle protectors including one for doors shown in FIG. 1. Stover teaches a vehicle cover with a door protector as particularly seen in FIG. 1 and which uses snap fasteners to secure it as shown in FIG. 7. Allen teaches a protector that covers windows and secures to side mirrors. Rodriguez discloses a cover that protects doors of a vehicle and includes securing straps. Nomura et al. disclose a window cover for a vehicle which also protects side mirrors and windshield.

The present invention distinguishes from the teachings of the prior art listed and discussed above since the present invention includes a sleeve which covers the inside and outside surfaces of a vehicle window that is incorporated into a door devoid of a frame for the window, and also includes a thin seal around its periphery to seal against the frame that it engages when the door is closed. The present invention further includes another portion that overlies the door structure to protect it as well as attachments in the forward and rear wheel wells to secure the protector in position. Additionally, the protector has structure which is sock-like in configuration and covers the mirror incorporated into the door structure.

SUMMARY OF THE INVENTION

The present invention relates to a comprehensive protective cover for vehicle door with frameless window. The present invention includes the following interrelated objects, aspects and features:

(1) In a first aspect, the present invention is intended for use in association with a vehicle door having a frameless window. The frameless window has front, top, and rear edges which are completely exposed when the door is open.

(2) The inventive protective cover includes a sleeve which overlies the entirety of the inside and outside of the window and has a peripheral seal which seals against the frame for the window which is integral with the vehicle body.

(3) The inventive protective cover also includes a sock-like sleeve covering and enclosing the vehicle mirror as well as a large protective portion which overlies the painted door structure below the window.

(4) The inventive device also preferably includes fore and aft straps with a fasteners on their ends which allow fastening to fastener halves mounted inside the front and rear wheel wells of the vehicle. In the preferred embodiment of the present invention, the fasteners comprise snaps having one half on each strap and the other half within each wheel well.

Accordingly, it is a first object of the present invention to provide a protective cover for vehicle door with frameless window.

It is a further object of the present invention to provide such a protective cover in which it includes a sleeve overlying the window with its edges exposed since the door does not have a frame.

It is a still further object of the present invention to provide such a protective cover in which the periphery of the sleeve covering the window includes a thin seal designed to seal against the frame integral with the vehicle body.

It is a still further object of the present invention to provide such a protective cover in which it includes a cover portion overlying the painted portion of the door.

These and other objects, aspects, and features of the present invention will be better understood from the following detailed description of the preferred embodiment when read in conjunction with the appended drawing figures.

SPECIFIC DESCRIPTION OF THE PREFERRED EMBODIMENT

Figure 1:
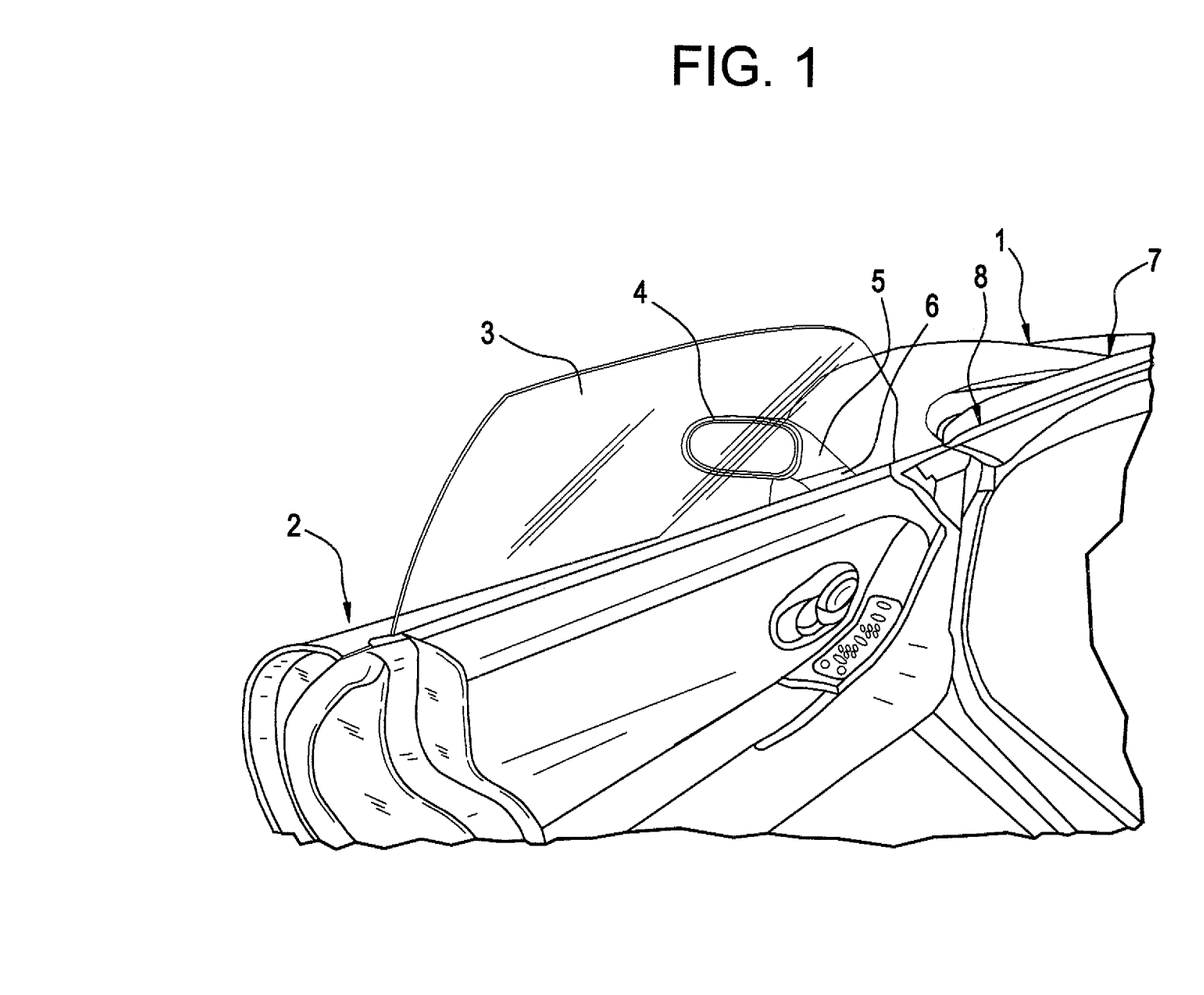
FIG. 1 shows a perspective view of a vehicle door with a frameless window.

Reference is first made to FIG. 1 which shows a vehicle generally designated by the reference numeral 1 and including a door 2 having a window 3 which, as seen, does not have a surrounding frame. A side view mirror 4 is visible through the window 3 and is connected to the door 2 by a connecting neck 5, 6 which permits adjustment. As also seen in FIG. 1, the vehicle 1 has a body 7 that includes a window frame 8 incorporated therein such that when the door is closed, the frame 8 surrounds the window 3.

Figure 2:
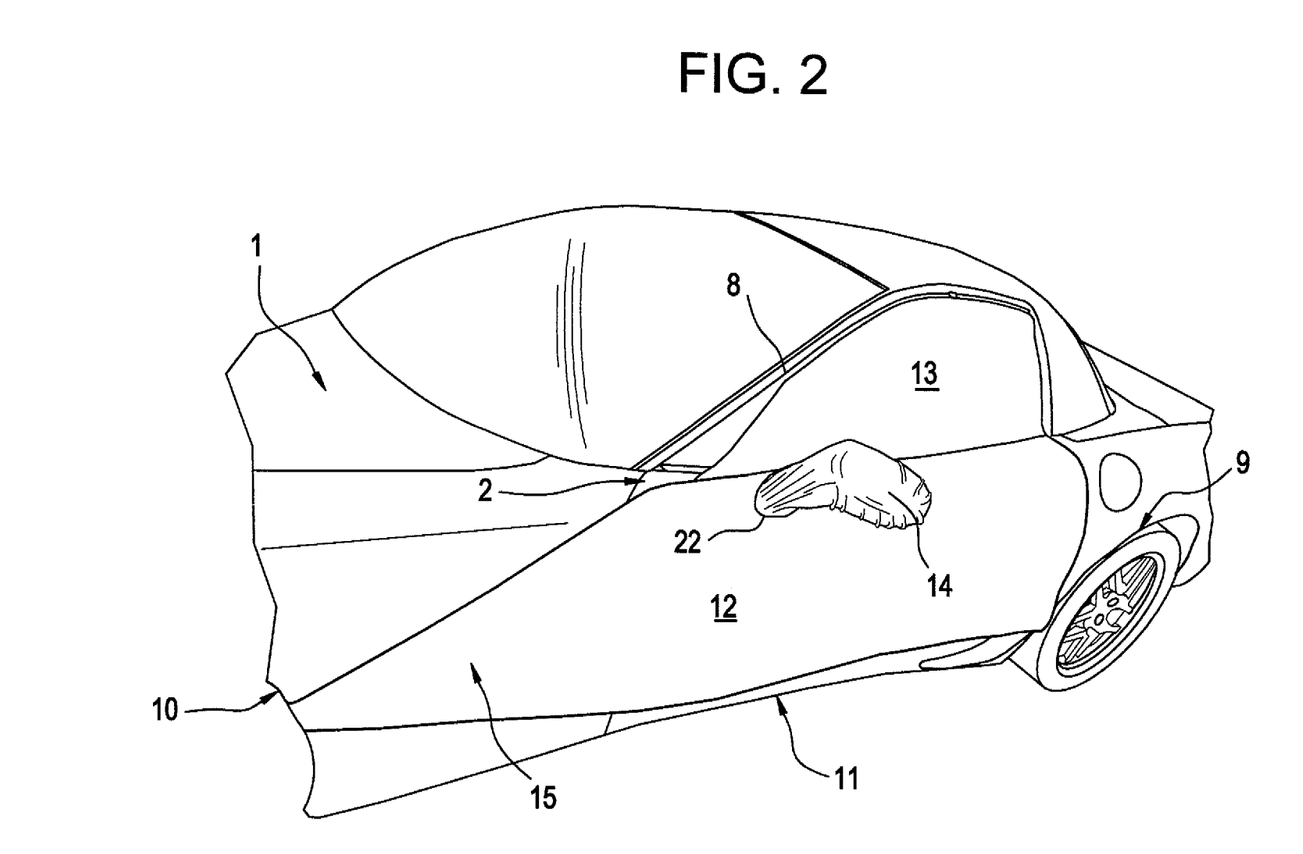
FIG. 2 shows a vehicle with frameless window with the present invention mounted thereon.

FIG. 2 shows the vehicle 1 which also has a rear wheel well 9 and a front wheel well 10. The inventive protective cover is generally designated by the reference numeral 11 and includes a first portion 12 covering the painted area of the door 2, a second portion 13 connected to said first portion and covering the window 3, and a third portion 14 covering the mirror 4.

Figure 5:
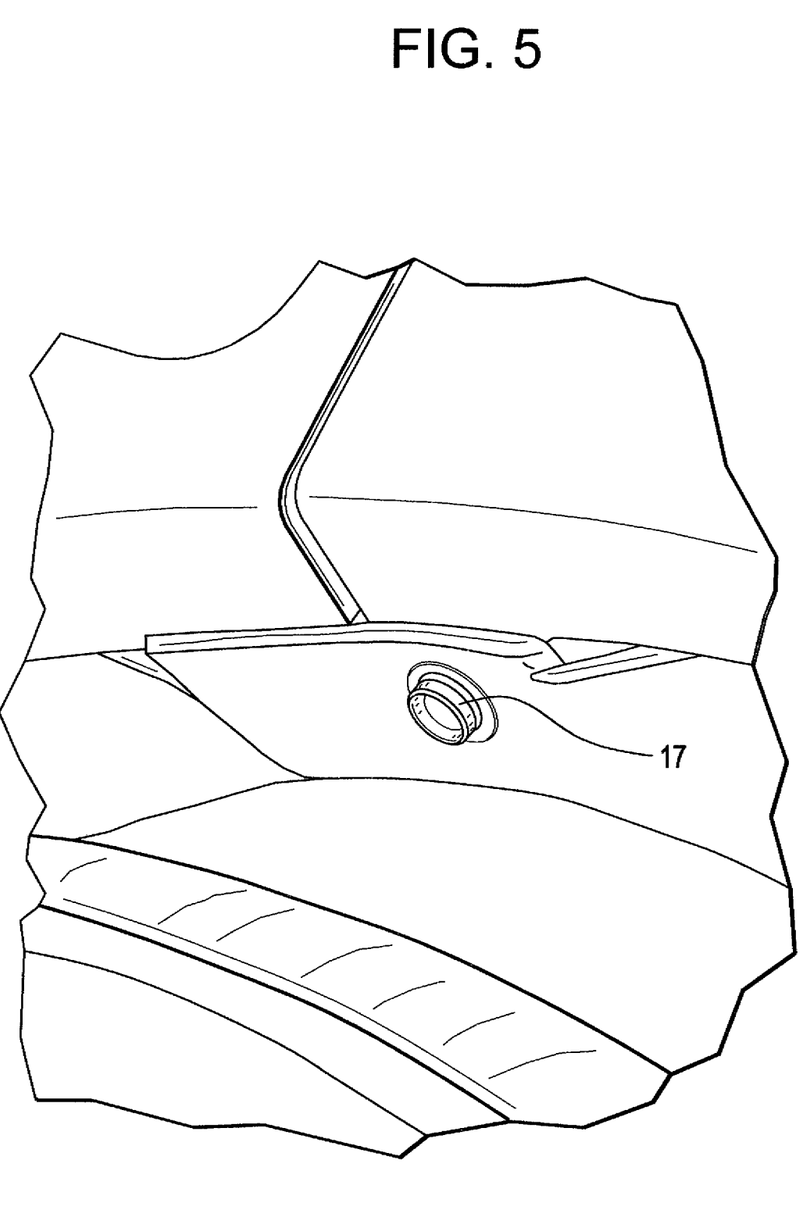
FIG. 5 shows the side view of one of the fastener halves used to receive a fastener half on a strap.
Figure 6:
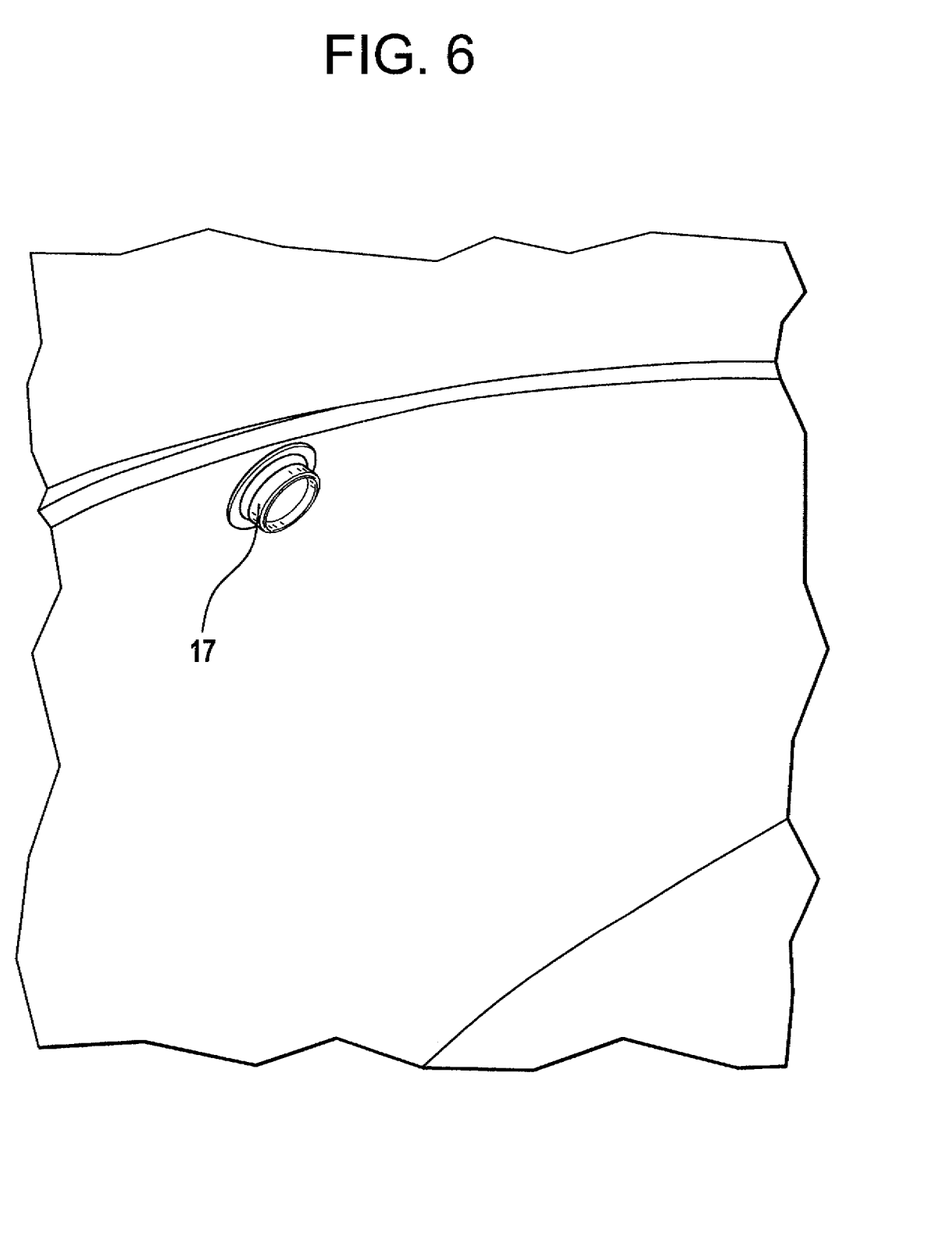
FIG. 6 shows the other fastener half on another wheel well.
Figure 7:
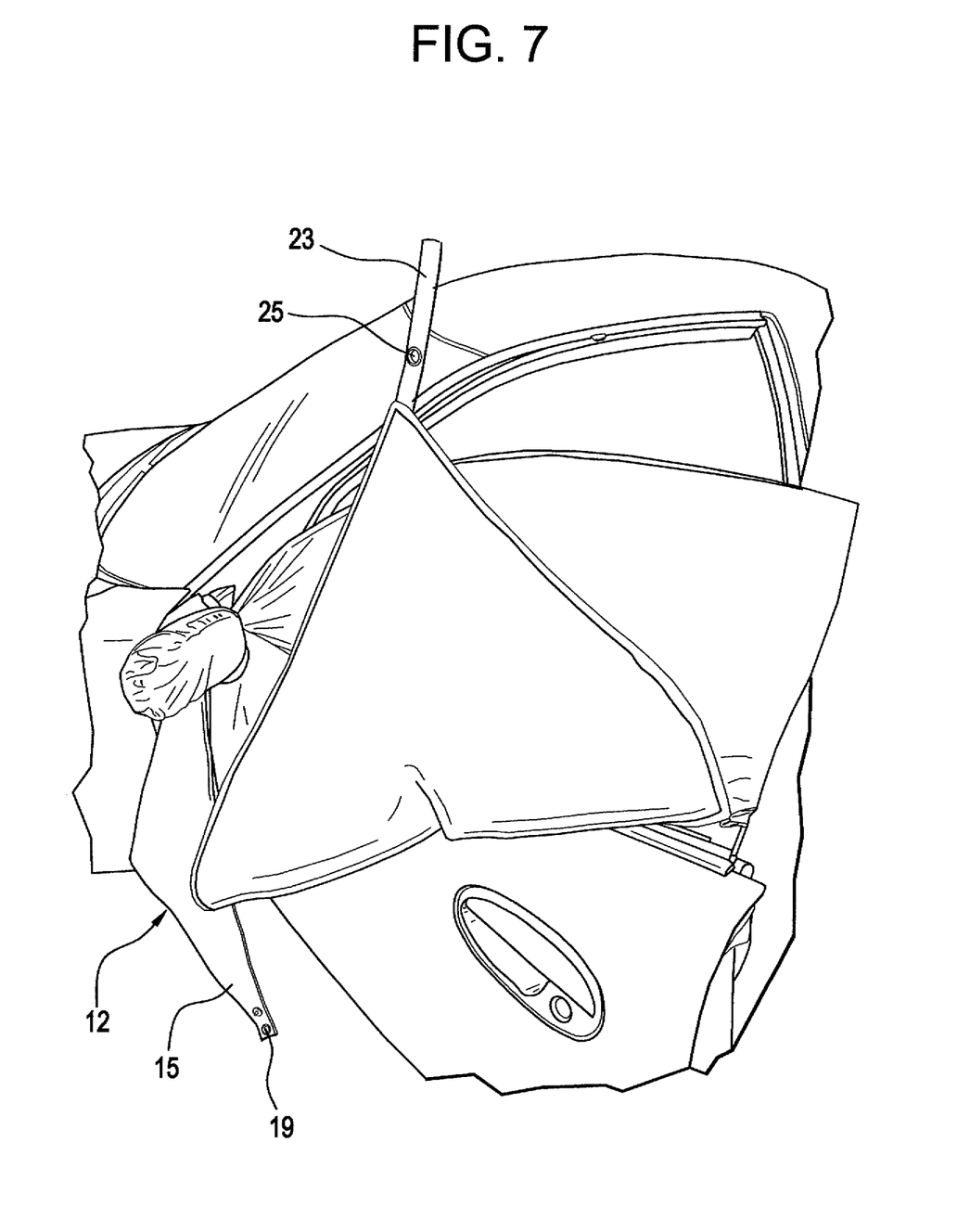
FIG. 7 shows the present invention partially peeled back to show the vehicle door underneath.

As clearly seen in FIG. 2, the portion 12 has a region 15 extending forward to the wheel well 10 and curves around into the wheel well 10. Within the wheel well 10 is a fastener half 17 which as seen in FIG. 5 may be a snap half. FIG. 7 shows the complementary snap half 19 on the region 15 which snaps onto the snap half 17. Similarly, the other wheel well 9 includes another snap half 21 (FIG. 6) and another strap 23 (FIG. 7) includes another snap half 25 that can releasably connect with the snap half 21. When the snap halves engage one another, the inventive device 11 is fastened in place as shown in FIG. 2.

Figure 9:
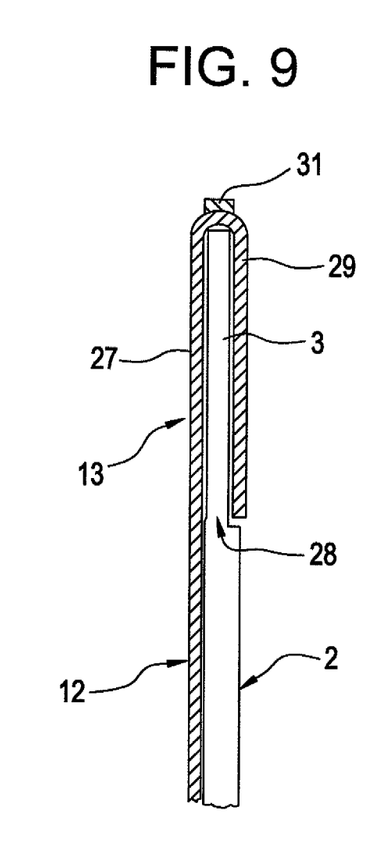
FIG. 9 shows a cross-sectional view showing the inventive protective cover enveloping the window.

The portion 13 comprises a sleeve that extends over both sides of the window 3. This is best seen with reference to FIG. 9 which shows the window 3 on the door 2 and the portion 13 has an outside portion 27 and an inside portion 29 as well as a peripheral seal 31 which extends about the periphery of the portion 13 and which engages the door frame 8 to seal the protective cover 11 when the door 2 is closed. The portion 13 has a downward facing opening 28 that permits it to be installed over the window from above and the outside portion 27 is connected to the portion 12.

Figure 4:
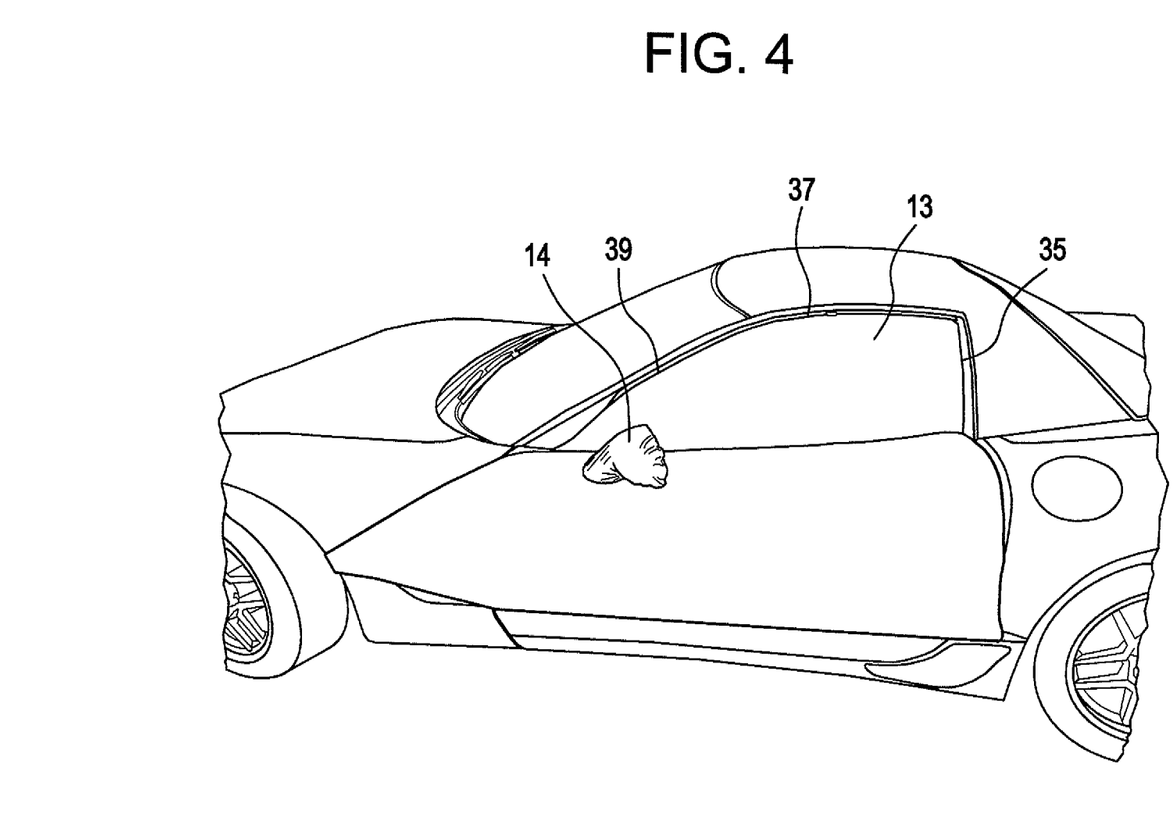
FIG. 4 shows a view similar to that of FIG. 2 but directly from the side of the associated vehicle.
Figure 8:
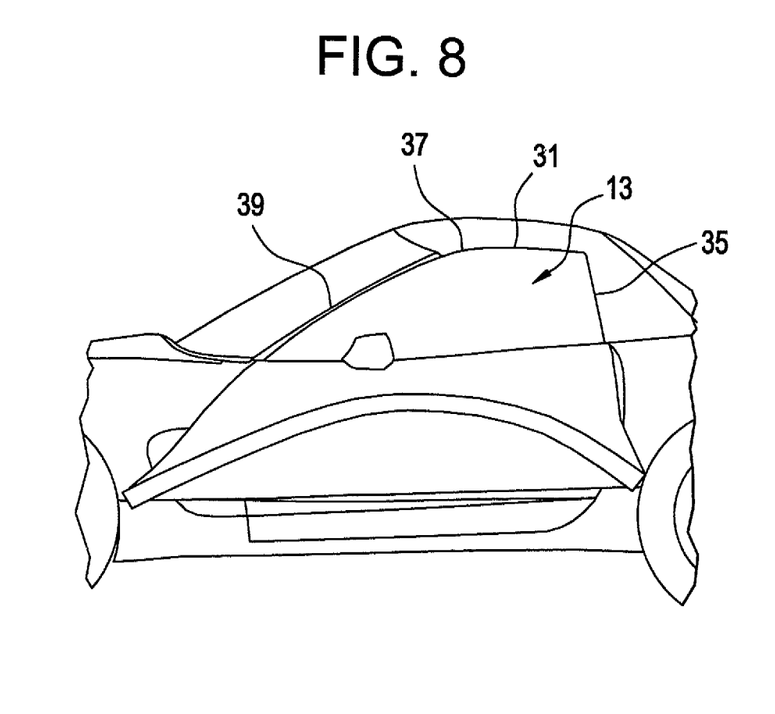
FIG. 8 shows a further side view of the present invention as mounted on a vehicle door including a peripheral seal around the window covering portion.

As seen in FIG. 8, the portion 13 includes a rear edge 35, a top edge 37, and a forward edge 39. These are sized and configured to snugly fit over the window 3 in the manner shown, in particular, in FIG. 2. This is also seen in FIG. 4.

The sock-like appendage 14 that overlies the side mirror 4 and its connecting portions 5 and 6 preferably emanates from an upper area of the portion 12 as best seen in FIG. 2. The sock-like appendage 14 attaches at a relatively circular opening 22 in the portion 12 and surrounds the opening 22.

Figure 3:
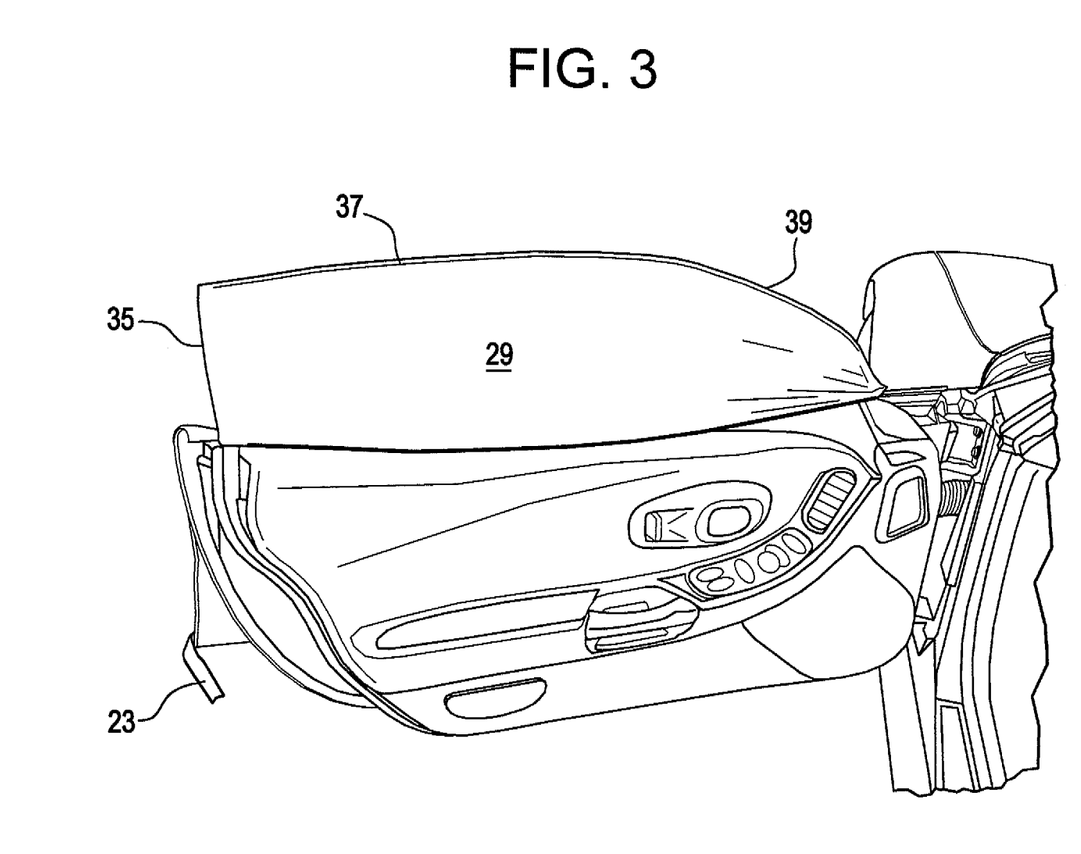
FIG. 3 shows a view similar to that of FIG. 1 showing the inventive protective cover installed over the window.

FIG. 3 shows the inventive protective cover 11 attached over the window 3 (not visible in FIG. 3) with the inside portion 29 clearly visible along with the rear 35, top 37, and forward 39 edges. The strap 23 is also visible in FIG. 3.

In the preferred embodiment of the present invention, the portion 13 is made of a lightweight stretch knit jersey-like material which is created as a pocket as shown in the drawing figures (particularly FIG. 9) to stretch over the window not only to provide security, preventing people from looking into the vehicle, but also to keep the vehicle interior cooler by blocking the sun's rays. The portion 12 including its forward extension region 15 may be made of any suitable strong material such as, for example, vinyl or leather, and the sock-like appendage 14 that fits over the mirror 4 may be made of the same material as the portion 13.

The straps 23 and 19 may be made of any suitable elastic material allowing them to stretch to the wheel wells 9 and 10 to allow tension when the snap halves are fastened together. The outer surfaces of the inventive protective cover can be made of eye-catching colors to attract the attention of adjacent parkers so they notice the owner's car and avoid damaging it.

Through use of the present invention, the door of a vehicle having a frameless window may be protected from door dings and other impacts, and the interior of the vehicle cabin may not only be kept cooler by blocking the sun's rays but also vision into the cabin may be blocked to preclude a potential thief from seeing what is inside the cabin.

As such, an invention has been disclosed in terms of a preferred embodiment thereof which fulfills each and every one of the objects of the invention as set forth hereinabove, and provides a new and useful protective cover for vehicle door with frameless window of great novelty and utility.

Of course, various changes, modifications and alterations in the teachings of the present invention may be contemplated by those skilled in the art, without departing from the intended spirit and scope thereof.

As such, it is intended that the present invention only be limited by the terms of the appended claims.

The invention claimed is:

1. In association with a vehicle having a door with a window which has outside edges exposed when said door is opened, a protective cover for said door and window, comprising:
    a) a sleeve having a downward facing opening and slidable over said window and enclosing inner and outer surfaces of said window, said sleeve having a peripheral seal extending substantially continuously about its periphery which engages a door frame of said vehicle when said door is closed to seal said protective cover; and
    b) a portion depending downwardly from said sleeve and sized to cover substantially an entirety of said door to adjacent a bottom of said door below said window.

2. The protective cover of claim 1, wherein said portion is attached to said sleeve at an outer section of said sleeve covering said outer surface of said window.

3. The protective cover of claim 1, wherein said protective cover is attached to said vehicle.

4. The protective cover of claim 3, wherein said vehicle has front and rear wheels within respective front and rear wheel wells, and front and rear straps extending from said protective cover and releasably attached within said wheel wells.

5. The protective cover of claim 4, wherein said straps have snap halves attached thereto and connectable to complementary snap halves mounted within said wheel wells.

6. The protective cover of claim 4, wherein said straps are made of an elastic material.

7. The protective cover of claim 4, wherein said straps extend from said portion.

8. The protective cover of claim 7, wherein said portion includes a region extending forwardly of said door and to which said front strap is attached.

9. The protective cover of claim 1, wherein said door includes a mirror mounted thereon, said protective cover further including a mirror cover for said mirror.

10. The protective cover of claim 9, wherein said mirror cover is made of a stretch knit material.

11. The protective cover of claim 9, wherein said portion is made of vinyl or leather and said sleeve is made of a stretch knit material.

12. The protective cover of claim 9, wherein said mirror cover extends outwardly from said portion.

13. The protective cover of claim 12, wherein said mirror cover extends outwardly from an opening formed in said portion.

14. The protective cover of claim 13, wherein said mirror cover surrounds said opening.

15. The protective cover of claim 1, wherein said portion is made of vinyl or leather.

16. The protective cover of claim 15, wherein said sleeve is made of a stretch knit material.

17. In association with a vehicle having a door with a window which has outside edges exposed when said door is opened, a protective cover for said door and window, comprising:

a) a sleeve having a downward facing opening and slidable over said window and enclosing inner and outer surfaces of said window, said sleeve having a peripheral seal engageable with a door frame in a body of said vehicle when said door is closed to seal said protective cover, said seal extending substantially continuously about a periphery of said sleeve; and b) a portion depending downwardly from said sleeve and sized to cover substantially an entirety of said door to adjacent a bottom of said door below said window, and further wherein said vehicle has front and rear wheels within respective front and rear wheel wells, and front and rear straps extending from said protective cover and releasably attached within said wheel wells.

18. The protective cover of claim 17, wherein said straps have snap halves attached thereto and connectable to complementary snap halves mounted within said wheel wells.

19. The protective cover of claim 17, wherein said door includes a mirror mounted thereon, said protective cover further including a mirror cover for said mirror extending outwardly from said portion, said mirror cover extending outwardly from an opening formed in said portion.

20. The protective cover of claim 17, wherein said portion includes a region extending forwardly of said door and to which said front strap is attached.

* * * * *